Dec. 8, 1964  D. G. McDANIEL ETAL  3,160,806
RECTIFIER CIRCUIT
Filed May 19, 1961

WITNESSES
John C. Heesley, Jr.
Raymond E. Cheers

INVENTORS
Deryl G. McDaniel &
Kent M. Blossom
BY
F. E. Browder
ATTORNEY

United States Patent Office 3,160,806
Patented Dec. 8, 1964

3,160,806
RECTIFIER CIRCUIT
Deryl G. McDaniel, Fort Shawnee, and Kent M. Blossom, Ohio City, Ohio, assignors to Westinghouse Electric Corporation, East Pittsburgh, Pa., a corporation of Pennsylvania
Filed May 19, 1961, Ser. No. 111,314
8 Claims. (Cl. 321—47)

This invention relates in general to alternating current to direct current converters and more particularly to alternating current to direct current converters which utilize a controlled rectifier as the regulating and the rectifying element.

In the design of single phase or multiphase alternating current to direct current converters of the controlled rectifier type it is necessary that the control circuit, which controls the triggering of the controlled rectifier during alternate half cycles of the alternating current signal, provide a precise and reliable signal to the control electrode of the controlled rectifier.

A common type of triggering circuit of the prior art uses a transistor oscillator such as a unijunction transistor relaxation oscillator for developing the aforementioned signals. This type of circuit requires a temperature compensating circuit as temperature variations cause the operation of the oscillator to become unstable. Also self heating of the circuit components cause the mode of operation to shift.

Another disadvantage of the controlled frequency oscillator type triggering circuit, is the complex circuit required in which the failure of any component causes a loss of the control and the output of the converter.

Still another disadvantage of the controlled frequency oscillator type triggering circuit is the requirement of a synchronizing circuit to synchronize the frequency of the oscillator to the frequency of the signal being rectified.

A more reliable device of the prior art for supplying a signal to the control electrode of a controlled rectifier is a magnetic amplifier. However, this type circuit applies considerable power to the control electrode of the controlled rectifier to thereby reduce the maximum power handling capabilities of the controlled rectifier.

Premature triggering of the controlled rectifier can be caused by the excitation current of the magnetic amplifier unless special provisions are made to eliminate these false signals. This problem becomes more significant at elevated temperatures.

When operating at elevated temperatures the prior art triggering circuits become somewhat unstable, that is they will frequently commence conduction prematurely.

Accordingly, it is the general object of this invention to provide a new and improved controlled rectifier control circuit.

It is a more particular object of this invention to provide a control circuit having a small number of time proven components of high reliability and low cost that will provide reliable operation of a controlled rectifier over a wide range of operating temperatures.

Still another object of this invention is to provide a control circuit producing a steep wave front triggering pulse of limited power thereby reducing the error in the timing of the firing point and limiting the losses in the control electrode circuit.

Other objects and advantages of this invention will become apparent from the detailed description when taken in conjunction with the drawings in which.

Although the detailed description and the drawings of this invention refer to a single phase circuit it is to be understood that the circuit disclosed may be used for either single phase or multiphase operation.

Figure 1:
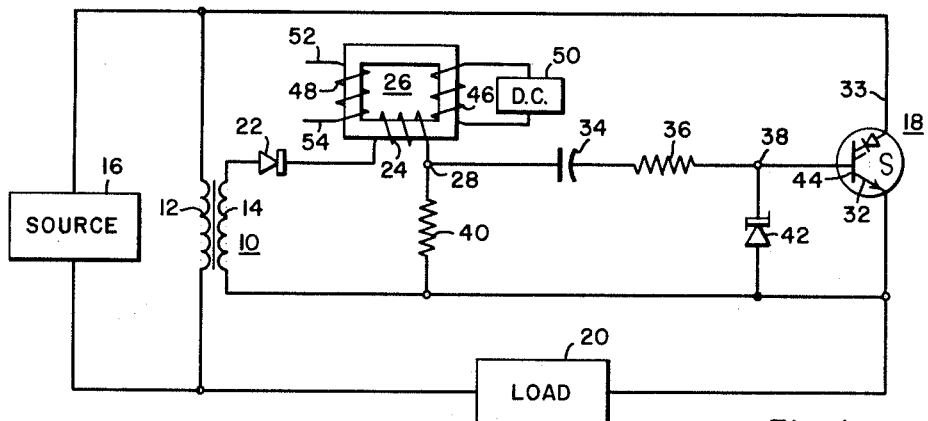
FIGURE 1 is a schematic diagram of a controlled rectifier control circuit.

Referring to the schematic diagram of FIG. 1, a transformer 10 having a primary winding 12 and a secondary winding 14 is provided to supply energy to the control circuit from an alternating current source 16.

The primary winding 12 of the transformer 10 is connected in parallel circuit relationship with the alternating current source 16. A controlled rectifier 18 is connected in series circuit relationship with a direct current load 20 and the source.

The secondary winding 14 provides the alternating current potential to the circuit of the control electrode 44 and is synchronized with the alternating current potential from source 16 which provides the energy to the controlled electrodes 32 and 33.

A diode 22 poled to pass current on the positive half cycle of the alternating current source 16 is connected in series circuit relationship with a load winding 24 of a multiple winding magnetic amplifier 26 having a substantially rectangular hysteresis loop.

The magnetic amplifier 26 may have a bias winding 48 connected by terminals 52 and 54 to a direct current source of the correct polarity and magnitude to give the desired magnetic amplifier operating characteristic. Similiarly, the control winding 46 of the magnetic amplifier 26 is connected to a direct current source 50. The magnetic amplifier 26 is reset during the negative half cycle of the alternating current by the control and bias voltage in the manner normally used in half wave magnetic amplifiers. The magnetic amplifier 26 is not limited to three windings as shown and should it be desired, a winding for a protection circuit or another control circuit could be added.

A series circuit comprising the diode 22 and the load winding 24 of the magnetic amplifier 26 is connected between a junction point 28 and the end of the secondary winding 14 of the transformer 10 that is positive during the positive half cycle of the alternating current source 16. The other end of the secondary winding 14 of the transformer 10 is connected by a conductor 30 to the cathode 32 of the controlled rectifier 18.

A capacitor 34 in series circuit relationship with a resistor 36 is connected between the junction point 28 and a junction point 38. A resistor 40 is connected from the junction point 28 to the conductor 30. The cathode of a Zener diode 42 is connected to the junction point 38 and the anode of the Zener diode 42 is connected to the conductor 30. The control electrode 44 of the controlled rectifier 18 is connected to the junction point 38.

Figure 2:
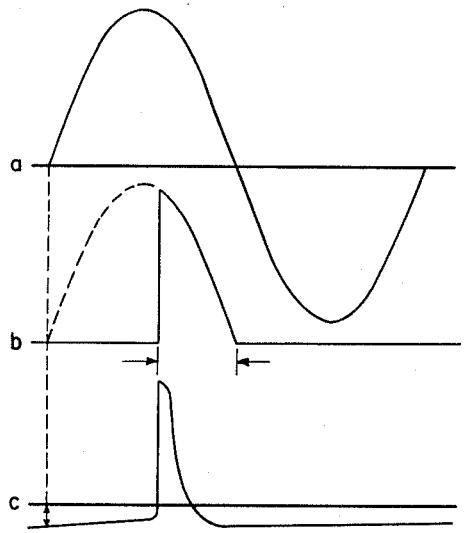
FIG. 2 shows the wave shape present at various points in the control circuit.

As the alternating current of the alternating current source 16 causes the end of the secondary winding 14 of the transformer 10 connected to the anode of the diode 22 to go positive, an excitation current flows from the positive end of the transformer secondary 14 through the diode 22, the magnetic amplifier load winding 24 and the resistor 40 back to the other end of the transformer secondary winding 14. FIG. 2a shows a sine wave as the alternating current source 16 voltage wave form. At some predetermined positive value of voltage across the magnetic amplifier load winding 24, determined by the value of control voltage and bias voltage on the magnetic amplifier 26 control winding 46 and bias winding 48, the magnetic amplifier 26 reaches saturation thereby suddenly changing the load winding 24 from a high impedance element to a low impedance element. The sudden change of impedance of the magnetic amplifier load winding 24 causes the voltage drop across the resistor 40 to increase very abruptly thereby placing a positive pulse through capacitor 34 and limiting resistor 36 on the control electrode 44 of the controlled rectifier 18 as shown in FIG. 2c. The positive pulse on the control electrode 44 causes the controlled rectifier 18 to commence conduction which continues for the remaining portion of the positive half cycle of the alternating current from the alternating current source 16. FIG. 2b shows the rectifier conduction wave form. The resistor 36 is provided to limit the voltage applied to the control electrode 44 of the controlled rectifier 18.

The reverse characteristic of the Zener diode 42 acts as a voltage clamping device. That is, if the positive pulse exceeds the reverse blocking rating of the Zener diode 42 the Zener diode 42 will conduct in the reverse direction thereby clamping or regulating the voltage at the magnitude of voltage. The Zener diode 42 may be replaced by a common diode at the expense of this voltage clamping or regulating protection for the control electrode 44 of the controlled rectifier 18.

As the alternating current from the alternating current source 16 starts negative the controlled rectifier 18 ceases conduction. The capacitor 34, which was charged during the conducting state of the controlled rectifier, discharges through the resistor 40, the Zener diode 42 and the resistor 36. The discharge current through the forward resistance and threshold voltage of the Zener diode 42 causes a small voltage drop across the Zener diode 42 thereby providing a small negative voltage to the control electrode 44 of the controlled rectifier 18. This negative voltage on the control electrode 44 holds the controlled rectifier 18 in the non-conducting state until the next positive pulse appears to thereby start conduction of the controlled rectifier 18 and cause the described cycle to repeat.

Since numerous changes may be made in the above described apparatus and other embodiments of the invention may be made without departing from the spirit and scope thereof, it is intended that all matter in the foregoing description or as shown on the accompanying drawings shall be interpreted as illustrative and not in a limiting sense.

We claim as our invention:

1. A control circuit for controlling the conductivity of a rectifier of the type which is triggered into conduction when a pulse of proper polarity with respect to the polarity of the potential applied to its controlled electrodes is applied to the control electrode and remains conductive thereafter until the polarity of the potential applied to its controlled electrodes is reversed, said circuit comprising a source of alternating current potential synchronized in frequency with the potential applied to the controlled electrodes of the rectifier, a capacitor having first and second terminals, means for developing a pulse of the proper polarity to render said rectifier conductive at a predetermined point in each alternate half cycle of the potential developed by said source, means for coupling said pulses through said capacitor to the control electrode of said rectifier, and means for discharging said capacitor including impedance means connected to the first terminal of said capacitor and a semiconductor diode connected to the second terminal of said capacitor, the discharge current of said capacitor flowing through said semiconductor diode and biasing said rectifier for non-conduction each time said rectifier becomes non-conductive.

2. A control circuit for controlling the conductivity of a rectifier of the type which is triggered into conduction when a pulse of proper polarity with respect to the polarity of the potential applied to the controlled electrodes is applied to the control electrode and remains conductive thereafter until the polarity of the potential applied to its controlled electrodes is reversed, said circuit comprising a source of alternating current potential synchronized in frequency with the potential applied to the controlled electrodes of the rectifier, a capacitor having first and second terminals, means for developing a pulse of the proper polarity to render said rectifier conductive at a predetermined point in each alternate half cycle of the potential developed by said source, means for coupling said pulses through said capacitor to the control electrode of said rectifier, said second terminal of said capacitor being connected to the control electrode of said rectifier, means for discharging said capacitor each time said rectifier becomes non-conductive, said last named means including a resistor connected between the first terminal of said capacitor and one of the controlled electrodes of said rectifier and a semiconductor diode connected between the control electrode and one of the controlled electrodes of said rectifier, said semiconductor diode being so poled that it is biased in its forward direction during the discharge of said capacitor.

3. A control circuit for controlling the conductivity of a rectifier of the type which is triggered into conduction when a pulse of proper polarity with respect to the polarity of the potential applied to its controlled electrodes is applied to the control electrode and remains conductive thereafter until the polarity of the potential applied to its controlled electrodes is reversed, said circuit comprising a source of alternating current potential applied to the controlled electrodes of said rectifier, a capacitor having first and second terminals, an impedance element, a semiconductor diode, means for connecting the second terminal of said capacitor to the control electrode of said rectifier, means for connecting the first terminal of said capacitor to one terminal of said impedance element, means for connecting the other terminal of said impedance element to one of the controlled electrodes of said rectifiers, means for connecting said semiconductor diode between said control electrode and said one controlled electrode of said rectifier, means for developing a pulse of the proper polarity to render said rectifier conductive at a predetermined point in each alternate half cycle of the potential developed by said source, means for applying said pulses to the junction point between the first terminal of said capacitor and said one terminal of said impedance element, said semiconductor diode being so poled that it is biased in its forward direction during the discharge time of said capacitor each time said rectifier becomes non-conductive.

4. A control circuit for controlling the conductivity of a rectifier of the type which is triggered into conduction when a pulse of proper polarity with respect to the polarity of the potential applied to its controlled electrodes is applied to the control electrode and remains conductive thereafter until the polarity of the potential applied to its controlled electrodes is reversed, said circuit comprising a source of alternating current potential synchronized in frequency with the potential applied to the controlled electrodes of the rectifier, a saturable reactor having a substantially rectangular hysteresis loop, a winding on said amplifier, a capacitor having first and second terminals, an impedance element, means for connecting the first terminal of said capacitor to one terminal of said winding and the second terminal of said capacitor to the control electrode of said rectifier, means for connecting said impedance element between the first terminal of said capacitor and one of the controlled electrodes of said rectifier, means for applying alternate half cycles of the potential produced by said source to the other terminal of said winding, said saturable reactor being so biased that it is driven into saturation during the occurrence of each alternate half cycle of the potential applied to said other terminal of its winding thereby producing a pulse across said impedance element, means including said impedance element for discharging said capacitor when said rectifier becomes non-conductive, and means included in last named means connected to the second terminal of said capacitor for biasing said rectifier for non-conduction during the discharge time of said capacitor.

5. A control circuit for controlling the conductivity of a rectifier of the type which is triggered into conduction when a pulse of proper polarity with respect to the polarity of the potential applied to its controlled electrodes is applied to the control electrode and remains conductive thereafter until the polarity of the potential applied to the controlled electrodes is reversed, said circuit comprising a source of alternating current potential synchronized in frequency with the potential applied to the controlled electrodes of said rectifier, a saturable reactor having a substantially rectangular hysteresis loop, a winding on said saturable reactor, a capacitor, an impedance element, a semiconductor diode, means for connecting said capacitor between one terminal of said winding and the control electrode of said rectifier, means for connecting said impedance element between said one terminal of said winding and one of the controlled electrodes of said rectifier, means for connecting said semiconductor diode between said control electrode and said one controlled electrode of said rectifier, means for applying alternate half cycles of the potential produced by said source to the other terminal of said winding, said saturable reactor being so biased that it is driven into saturation during the occurrence of each alternate half cycle of the potential applied to said other terminal of said winding thereby producing a pulse across said impedance element, said semiconductor diode being so poled as to be biased in the forward direction during the discharge of said capacitor following each operation of said rectifier.

6. A control circuit for controlling the conductivity of a silicon controlled rectifier having a control electrode and a pair of controlled electrodes, a source of alternating current potential having one terminal connected to one of the controlled electrodes and another terminal connected through a direct current load to the other of said pair of controlled electrodes of said rectifier, a transformer having a primary winding connected in parallel circuit relationship with said alternating current source and a secondary winding providing a source of alternating current potential to said control circuit that is synchronized to the frequency of the first named alternating current source, a saturable reactor having a substantially rectangular hysteresis loop, a winding on said saturable reactor, a capacitor, an impedance element, a semiconductor diode, means for connecting said capacitor between one terminal of said winding and the control electrode of said rectifier, means for connecting said impedance element between said one terminal of said winding and said other controlled electrode of said rectifier, means for connecting said semiconductor diode between said control electrode and said other controlled electrode of said rectifier, means for applying alternate half cycles of the alternating current produced by a transformer secondary to the other terminal of said winding, said saturable reactor being so biased that it is driven into saturation during the occurrence of each alternate half cycle applied to said other terminal of said winding thereby producing a pulse across said impedance element, said semiconductor diode being so poled as to be biased in the forward direction during the discharge of said capacitor following each operation of said rectifier.

7. A control circuit for controlling the conductivity of a rectifier of the type which is triggered into conduction when a pulse of the proper polarity with respect to the polarity of the potential applied to the controlled electrodes is applied to the control electrode and remains conductive thereafter until the polarity of the potential applied to its controlled electrodes is reversed, said circuit comprising a source of alternating current potential synchronized in frequency with the potential applied to the controlled electrodes of the rectifier, a capacitor having first and second terminals, means for developing a pulse of proper polarity to render said rectifier conductive at a predetermined point in each alternate half cycle of the potential developed by said source, means coupling said pulses through said capacitor to the control electrode of said rectifier, said second terminal of said capacitor being connected to the control electrode of said rectifier, means for discharging said capacitor each time said rectifier becomes non-conductive, said last named means including a resistor connected between the first terminal of said capacitor and one of the controlled electrodes of said rectifier and a Zener diode connected between the control electrode and one of the controlled electrodes of said rectifier, said Zener diode being so poled that it is biased in its forward direction during the discharge of said capacitor.

8. A control circuit for controlling the conductivity of a rectifier of the type which is triggered into conduction when a pulse of proper polarity with respect to the polarity of the potential applied to the controlled electrodes is applied to the control electrode and remains conductive thereafter until the polarity of the potential applied to its controlled electrodes is reversed, said circuit comprising a source of alternating current potential applied to the controlled electrodes of the rectifier, a capacitor having first and second terminals, means for developing a pulse of the proper polarity to render said rectifier conductive at a predetermined point in each alternate half cycle of the potential developed by said source, means for coupling said pulses through said capacitor to the control electrode of said rectifier, the second terminal of said capacitor being connected to the control electrode of said rectifier, means for discharging said capacitor each time said rectifier becomes non-conductive, said last named means including a resistor connected between the first terminal of said capacitor and one of the controlled electrodes of said rectifier, a Zener diode connected between the control electrode and one of the controlled electrodes of said rectifier, said Zener diode being so poled that it is biased in its forward direction during the discharge of said capacitor, said Zener diode being biased in its reverse direction during said pulse rendering said rectifier conducting thereby limiting the magnitude of the pulse voltage applied to the control electrode.

References Cited in the file of this patent
UNITED STATES PATENTS
2,798,985   Hansen _____ July 9, 1957